(12) United States Patent
Lee (10) Patent No.: US 9,333,609 B2
(45) Date of Patent: May 10, 2016

(54) TOOL CARRIER UNIT OF A TOOL MAGAZINE

(75) Inventor: Chang Min Lee, Gyeongsangnam-do (KR)

(73) Assignee: Doosan Infracore Co., Ltd., Incheon (KR)

(*) Notice: Subject to any disclaimer, the term of this patent is extended or adjusted under 35 U.S.C. 154(b) by 352 days.

(21) Appl. No.: 13/993,197

(22) PCT Filed: Dec. 8, 2011

(86) PCT No.: PCT/KR2011/009489
§ 371 (c)(1),
(2), (4) Date: Jun. 11, 2013

(87) PCT Pub. No.: WO2012/081860
PCT Pub. Date: Jun. 21, 2012

(65) Prior Publication Data
US 2013/0260973 A1    Oct. 3, 2013

(30) Foreign Application Priority Data
Dec. 13, 2010 (KR) .......................... 10-2010-0126655

(51) Int. Cl.
*B23Q 3/155*    (2006.01)
(52) U.S. Cl.
CPC .......... *B23Q 3/1554* (2013.01); *B23Q 3/15526* (2013.01); *Y10T 483/175* (2015.01);
(Continued)

(58) Field of Classification Search
CPC .................... Y10T 483/1717; Y10T 483/175; Y10T 483/1845; Y10T 483/1855; B23Q 3/15525; B23Q 3/1554
USPC .......................................... 483/23, 37, 63, 64
See application file for complete search history.

(56) References Cited

U.S. PATENT DOCUMENTS

| 5,102,177 A | * | 4/1992 | Dreisig et al. ................ 294/106 |
| 5,474,514 A | * | 12/1995 | Rutschle et al. .................. 483/1 |

(Continued)

FOREIGN PATENT DOCUMENTS

| CN | 2897533 Y | 5/2007 |
| CN | 201224041 Y | 4/2009 |

(Continued)

OTHER PUBLICATIONS

Communication dated May 9, 2014 for European Patent Application No. 11847938.5, 5 pages.

(Continued)

*Primary Examiner* — Sunil K Singh
*Assistant Examiner* — Michael Vitale
(74) *Attorney, Agent, or Firm* — John D. Veldhuis-Kroeze; Westman, Champlin & Koehler, P.A.

(57) ABSTRACT

The present disclosure relates to a tool carrier unit of a tool magazine. The tool carrier unit of a tool magazine according to the present invention includes: a body frame installed across a first tool magazine and a second tool magazine; a clamping unit disposed at one side of the body frame and configured to clamp a tool accommodated in any one of the first tool magazine and the second tool magazine; an LM unit (liner motion unit) disposed at one side of the body frame and configured to guide a movement of the clamping unit; an actuator disposed at one side of the body frame and configured to move the clamping unit; and an unclamping unit disposed at the body frame and configured to unclamp the tool when the clamping unit reaches the first tool magazine or the second tool magazine.

3 Claims, 6 Drawing Sheets (52) U.S. Cl.
CPC ...... *Y10T483/1717* (2015.01); *Y10T 483/1845* (2015.01); *Y10T 483/1855* (2015.01); *Y10T 483/1891* (2015.01)

(56) References Cited

U.S. PATENT DOCUMENTS

2002/0013202 A1 * 1/2002 Kato ............................... 483/41
2010/0145498 A1 * 6/2010 Uchikawa et al. ............ 700/179

FOREIGN PATENT DOCUMENTS

| | | |
|---|---|---|
| CN | 201249363 Y | 6/2009 |
| DE | 3501113 | 7/1986 |
| DE | 3501113 A1 * | 7/1986 |
| DE | 4033036 | 1/1992 |
| DE | 4304361 | 8/1994 |
| JP | 09-057562 A | 3/1997 |
| JP | H0957562 A | 3/1997 |
| KR | 10-1990-0001859 | 3/1990 |
| KR | 10-2007-0066680 A | 6/2007 |
| KR | 10-2009-0111472 A | 10/2009 |
| TW | 200902224 A | 1/2009 |
| WO | WO 2010123135 A1 * | 10/2010 |

OTHER PUBLICATIONS

Search Report dated Jul. 9, 2012 and written in Korean with English translation attached for International Patent Application No. PCT/KR2011/009489 filed Dec. 8, 2011, 5 pages.

* cited by examiner

TOOL CARRIER UNIT OF A TOOL MAGAZINE

CROSS-REFERENCE TO RELATED APPLICATION

This application is a Section 371 National Stage Application of International Application No. PCT/KR2011/009489, filed Dec. 8, 2011 and published, not in English, as WO2012/081860 on Jun. 21, 2012.

FIELD OF THE DISCLOSURE

The present disclosure relates to a tool carrier unit of a tool magazine, and more particularly, to a tool carrier unit of a tool magazine, which transfers tools between one tool magazine and the other tool magazine.

BACKGROUND OF THE DISCLOSURE

In general, a tool magazine and an automatic tool changer are provided at a numerical control multi-tasking machine tool, various types of tools are accommodated in the tool magazine, and the automatic tool changer changes tools between a spindle and the tool magazine in accordance with a command.

Meanwhile, as processing shapes of work pieces become complicated and varied, tools having various shapes are required accordingly, but there is a problem in the related art in that there is a limitation in the number of tools that may be accommodated in the tool magazine, and therefore there is a limitation to process work pieces in various shapes.

Alternatively, a specific tool may be required to perform a special processing, but when the specific tool is not accommodated in the tool magazine, there is a problem in that it is inconvenient to operate the tool in a temporary manner by manually replacing and mounting the required specific tool when the tool magazine is stopped.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Accordingly, the present disclosure has been made in an effort to overcome a technical problem, and an object of the present disclosure is to provide a tool carrier unit of a tool magazine, capable of enlarging the tool magazine so as to use more tools, and transferring tools between one tool magazine and the other tool magazine.

Technical problems of the present disclosure are not limited to the technical problems described above, and technical problems that are not described will be clearly understood by a person skilled in the art from the description below.

A tool carrier unit of a tool magazine according to the present disclosure for achieving the technical problem includes: a body frame installed across a first tool magazine and a second tool magazine; a clamping unit disposed at one side of the body frame and configured to clamp a tool accommodated in any one of the first tool magazine and the second tool magazine; an LM unit (linear motion unit) disposed at one side of the body frame and configured to guide a movement of the clamping unit; an actuator disposed at one side of the body frame and configured to move the clamping unit; and an unclamping unit disposed at the body frame and configured to unclamp the tool when the clamping unit reaches the first tool magazine or the second tool magazine.

In addition, the clamping unit may include: a first clamp block installed on the LM unit to be linearly moved, and having a first slide hole formed at one side thereof, and a first jaw installed at a lower side thereof; a second clamp block installed on the LM unit to be linearly moved, and having a second jaw installed at a lower side thereof to face the first jaw; a clamp shaft penetrating the first slide hole, and having an end portion fixed to the second clamp block; and a clamp spring installed on the clamp shaft, having one end portion that is in contact with the first clamp block, and the other end portion that is fixed to an end portion of the clamp shaft, and applying restoring force in a direction in which the first clamp block and the second clamp block have the most narrow gap between each other.

In addition, the unclamping unit may include: a first clamp block installed on the LM unit to be linearly moved, and having a second slide hole formed at one side thereof; a second clamp block installed on the LM unit to be linearly moved, and having a third slide hole formed at one side thereof; first and second shaft pins installed in the first and second clamp blocks, respectively, in a direction orthogonal to a direction in which the first and second clamp blocks are linearly moved; a first link having one side axially coupled to the first shaft pin; a second link having one side axially coupled to the second shaft pin; a third shaft pin axially coupled to the other end portions of the first link and the second link; a roller installed on the third shaft pin; first and second stoppers formed at both sides of the body frame, respectively, with which the roller comes into contact, and on which the roller slides; and a shaft 140 having one side fastened to a rod of the actuator to push the first clamp block or the second clamp block in a direction in which the rod is moved.

In addition, the shaft 140 may have a first small diameter portion 144 and a second small diameter portion 146 formed, respectively, at both sides of a large diameter portion 142, the first small diameter portion 144 may penetrate the second slide hole 134, the second small diameter portion 144 may penetrate the third slide hole 135, and the first small diameter portion 144 may have one side fastened to the rod 310 so that the large diameter portion 142 pushes the first clamp block 131 when the actuator 300 performs a contraction operation, and the large diameter portion 142 pushes the second clamp block 132 when the actuator 300 performs an extension operation.

Details of other exemplary embodiments are included in the detailed description and the drawings.

The tool carrier unit of the tool magazine according to the present disclosure, which is configured as described above, may transfer the tool between one tool magazine and the other tool magazine such that the tool accommodated in the tool magazine disposed at a position far from the spindle may be provided to the spindle.

In addition, the tool carrier unit of the tool magazine according to the present disclosure may additionally mount a new tool magazine even to the existing numerical control multi-tasking machine tool which is used by including a single tool magazine, and accordingly, work pieces having more varied and complicated shapes may be processed.

DESCRIPTION OF THE DRAWINGS

FIGS. 4 to 6 are views for explaining an operation of the tool carrier unit of the tool magazine according to the exemplary embodiment of the present disclosure, in which

DESCRIPTION OF MAIN REFERENCE NUMERALS OF DRAWINGS 10, 20: First and second tool magazines
12, 22: First and second tool gripper units
C: Clamping unit
U: Unclamping unit
100: Tool carrier unit
110: Body frame
120: LM unit (linear motion unit)
122: LM guide
123, 124: First and second LM blocks
131, 132: First and second clamp blocks
133, 134, 135: First, second, and third slide holes
136: Fixing portion
140: Shaft
142: Large diameter portion
144, 146: First and second small diameter portions
151, 152, 153: First, second, and third shaft pins
161, 162: First and second links
170: Roller
181, 182: First and second jaws
191, 192: First and second stoppers
200: Clamp shaft
210: Clamp spring
212, 214: First and second spring pockets
300: Actuator
310: Rod

DETAILED DESCRIPTION

The advantages and characteristics of the present disclosure and methods for achieving the same will become clear from the exemplary embodiments set forth in detail below with reference to the attached drawings.

Like reference numerals represent like elements throughout the specification.

Hereinafter, a tool carrier unit of a tool magazine according to an exemplary embodiment of the present disclosure will be described with reference to FIG. 1.

Figure 1:
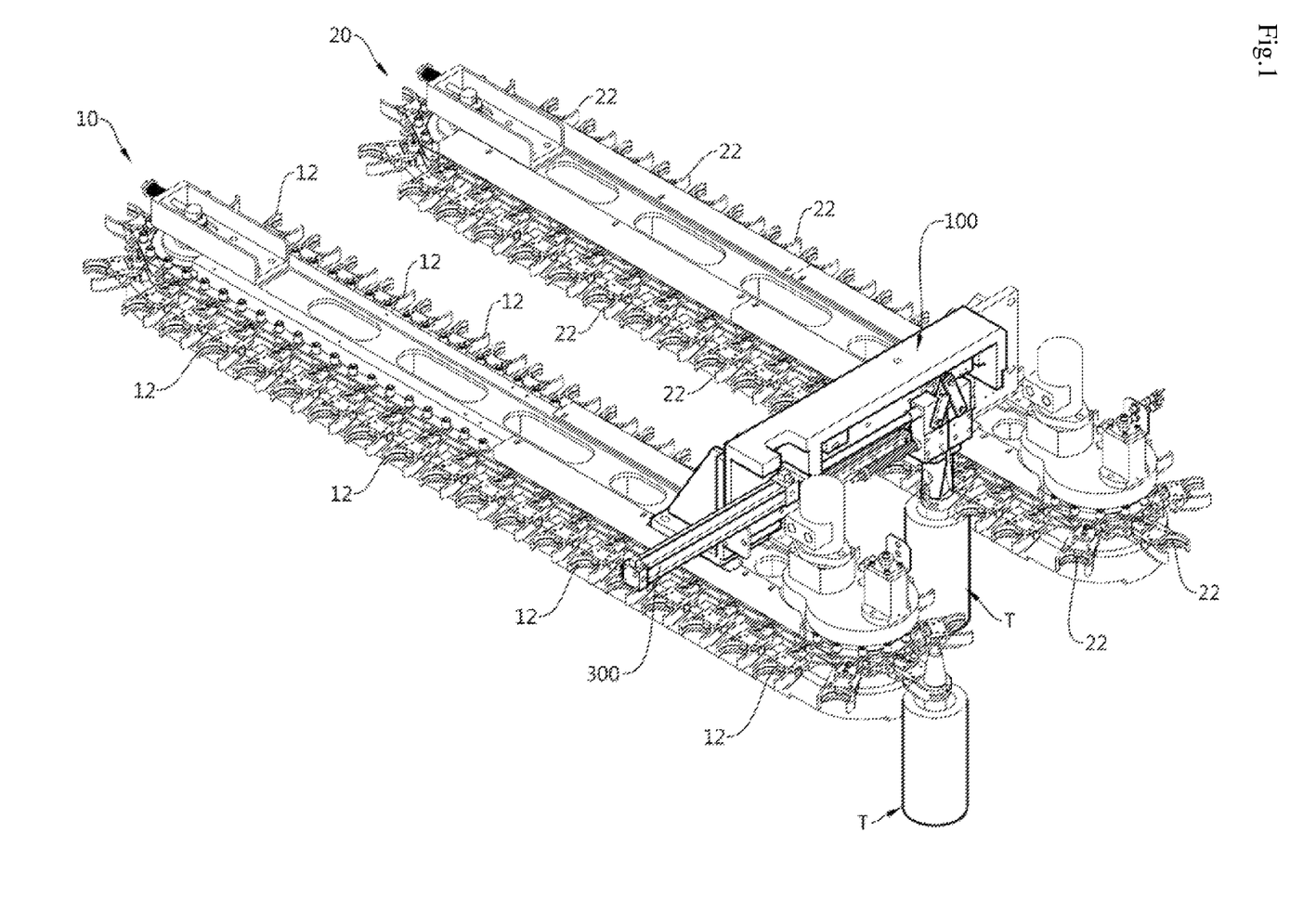
FIGS. 1 and 2 are views for explaining a tool carrier unit of a tool magazine according to an exemplary embodiment of the present disclosure.

FIG. 1, which is an accompanying drawing, is a view for explaining a tool carrier unit of a tool magazine according to an exemplary embodiment of the disclosure.

As illustrated in FIG. 1, a tool magazine may include first and second tool magazines 10 and 20 which are installed in parallel in plural numbers, and a tool carrier unit 100 according to the exemplary embodiment of the disclosure may be installed across the first tool magazine 10 and the second tool magazine 20.

Meanwhile, the first tool magazine 10 may be a component that is already installed at a numerical control multi-tasking machine tool, the second tool magazine 20 may be a component that is newly and additionally installed, and therefore a tool T accommodated in the first tool magazine 10 is accommodated or drawn out by the existing automatic tool changer (ATC) that is operated, thereby changing tools with a spindle.

In addition, the tool T accommodated in the second tool magazine 20 may be transferred to the first tool magazine 10 by the tool carrier unit 100 according to the exemplary embodiment of the present disclosure, and as a result, the tool T, which has been accommodated in the second tool magazine 20, may be provided to the spindle by the automatic tool changer provided at the first tool magazine 10.

The first and second tool magazines 10 and 20 have first and second tool gripper units 12 and 22 provided on chains, in which the chains travel along rails formed on an outer circumference of a tool magazine frame, and the first and second tool gripper units 12 and 22 are on standby in a state in which the tool T is accommodated in the first and second tool gripper units 12 and 22 or in a vacant state in which the tool T is not accommodated, and as a result, the specific first and second tool gripper units 12 and 22 change tools in a state of reaching a tool change position.

The tool change position may be a position where a clamping unit C of the tool carrier unit 100 according to the exemplary embodiment of the present disclosure may reach the first and second tool magazines 10 and 20 and clamp/unclamp the tool T.

A configuration of the tool carrier unit 100 according to the exemplary embodiment of the present disclosure will be described in more detail with reference to FIGS. 2 and 3 which are accompanying drawings.

Figure 2:
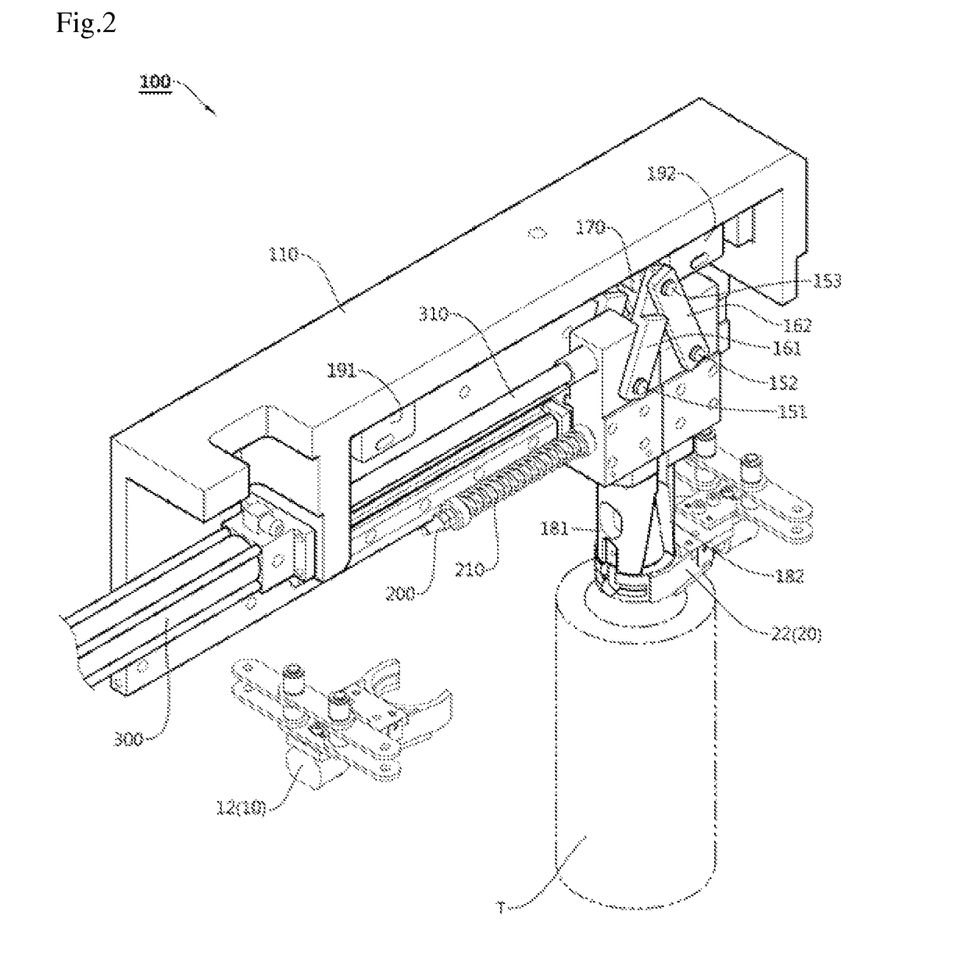
Figure 3:
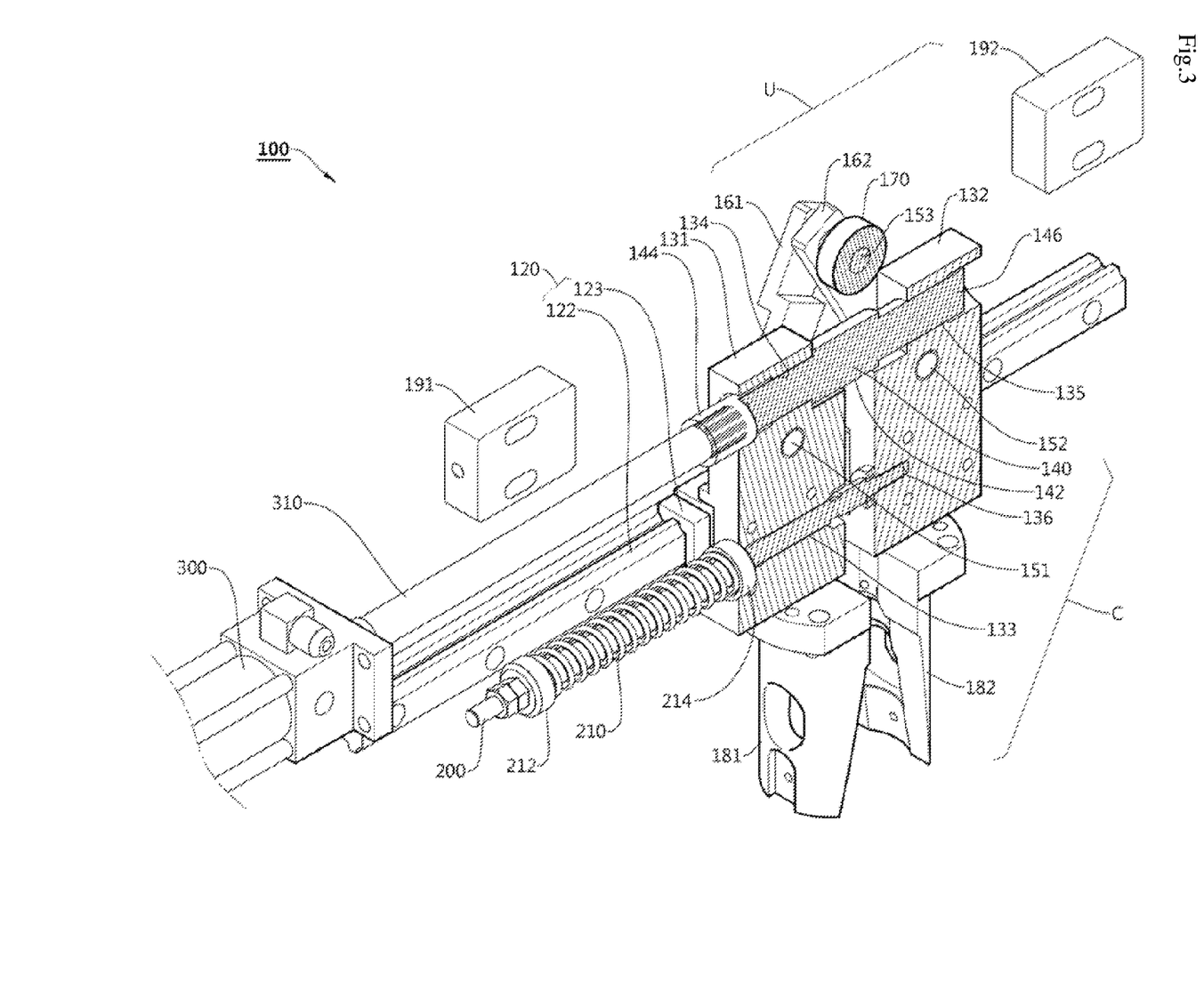
FIG. 3 is a partially cross-sectional perspective view illustrating main parts extracted from the tool carrier unit of the tool magazine according to the exemplary embodiment of the present disclosure.

FIG. 2, which is an accompanying drawing, is a view for explaining the tool carrier unit of the tool magazine according to the exemplary embodiment of the present disclosure, and FIG. 3 is a partially cross-sectional perspective view illustrating main parts extracted from the tool carrier unit of the tool magazine according to the exemplary embodiment of the present disclosure.

As illustrated in FIGS. 2 and 3, the tool carrier unit 100 has an LM unit (linear motion unit) 120 installed at one side of a body frame 110, the clamping unit C is slidably installed on the LM unit 120, an actuator 300 is installed on the body frame 110, and the actuator 300 moves the clamping unit C.

Meanwhile, as illustrated in FIG. 1, the body frame 110 is disposed in a direction across the first and second tool magazines 10 and 20, and fixed by a known fixing means such as a fixing bracket, a bolt, and a nut.

The LM unit 120 includes an LM guide 122, and first and second LM blocks 123 and 124, and the clamping unit C is installed on the first and second LM blocks 123 and 124.

That is, the LM unit 120 allows straightness to be guaranteed when the clamping unit C is moved, and supports the weight of the clamping unit C, thereby allowing the clamping unit C to be able to be stably moved.

An unclamping unit U is provided at one side of the clamping unit C, and when the clamping unit C is moved by driving the actuator 300 and reaches the tool change position, the tool T is unclamped so as to be freely released by the unclamping unit U at the clamping unit C.

The clamping unit C refers to a configuration of clamping the tool T by allowing a pair of first and second clamp blocks 131 and 132 to be tightened by a clamp spring 210.

In more detail, the first clamp block 131 is installed on the first LM block 123 of the LM unit 120, and the second clamp block 132 is installed on the second LM block 124 of the LM unit 120.

In addition, a first slide hole 133 is formed at one side of the first clamp block 131 in a direction parallel to the LM guide 122 of the LM unit 120, a clamp shaft 200 penetrates the first slide hole 133, and one end portion of the clamp shaft 200 is fastened and fixed to a fixing portion 136 of the second clamp block 132.

In addition, the clamp spring 210 is disposed at the clamp shaft 200, one side of the clamp spring 210 is in close contact with one side surface of the first clamp block 131, and the other side of the clamp spring 210 is fixed to an outer end portion of the clamp shaft 200.

That is, the clamp spring 210 applies restoring force in a direction in which the first clamp block 131 and the second clamp block 132 are close to each other.

Meanwhile, first and second spring pockets 212 and 214 are provided on both end portions of the clamp spring 210, so as to prevent the clamp spring 210 from being arbitrarily moved away and a posture of the clamp spring 210 from being distorted, thereby positioning the position of the clamp spring 210 in place.

In addition, first and second jaws 181 and 182 are installed at a lower side of the first and second clamp blocks 131 and 132, respectively.

The first and second jaws 181 and 182 have an inner side that may be formed in a shape corresponding to a shape of a tool shank so as to grip the tool shank of the tool T.

In addition, first and second sensors 183 and 184 are installed at one side of the first and second jaws 181 and 182, respectively, so as to confirm whether or not the tool T is present.

That is, when a clamp command is executed, an error signal may be generated when the tool T is not present inside the clamping unit C.

The unclamping unit U includes partial constituent elements of the clamping unit C.

In more detail, a second slide hole 134 is formed at one side of the first clamp block 131, a third slide hole 135 is formed at one side of the second clamp block 132, and first and second shaft pins 151 and 152 are installed in the first and second clamp blocks 131 and 132, respectively, in a direction orthogonal to a direction in which the first and second clamp blocks 131 and 132 are linearly moved.

In addition, a first link 161 is axially coupled to one side of the first shaft pin 151, a second link 162 is axially coupled to one side of the second shaft pin 152, and a third shaft pin 153 is axially coupled to the other end portions of the first link 161 and the second link 162.

In addition, a roller 170 is installed on the third shaft pin 153, first and second stoppers 191 and 192 are disposed at both sides of the body frame 110, respectively, and the roller 170 may come into contact with and slide on the first and second stoppers 191 and 192.

In addition, a shaft 140 is installed in the first and second clamp blocks 131 and 132, a large diameter portion 142 is formed at a medium portion of the shaft 140, and first and second small diameter portions 144 and 146 are formed at both sides of the large diameter portion 142, respectively.

The first small diameter portion 144 penetrates the second slide hole 134, the second small diameter portion 144 penetrates the third slide hole 135, and one side of the first small diameter portion 144 is fastened to a rod 310 of the actuator 300.

That is, when the actuator 300 is extended or contracted, the rod 310 is linearly moved, and at this time, the large diameter portion 142 pushes the first clamp block 131 or the second clamp block 132 along a direction in which the rod 310 is moved.

Meanwhile, the first and second stoppers 191 and 192 may be integrally provided with the body frame 110, or alternatively, may be provided as separate components.

Particularly, when the first and second stoppers 191 and 192 are provided as separate components, a position where the first and second stoppers 191 and 192 are installed on the body frame 110 may be minutely changed, and thereby the tool change position with the tool gripper units 12 and 22 of the first and second tool magazines 10 and 20 may be minutely adjusted.

Hereinafter, an operation will be described with reference to FIGS. 4 to 6 that are accompanying drawings.

Figure 4:
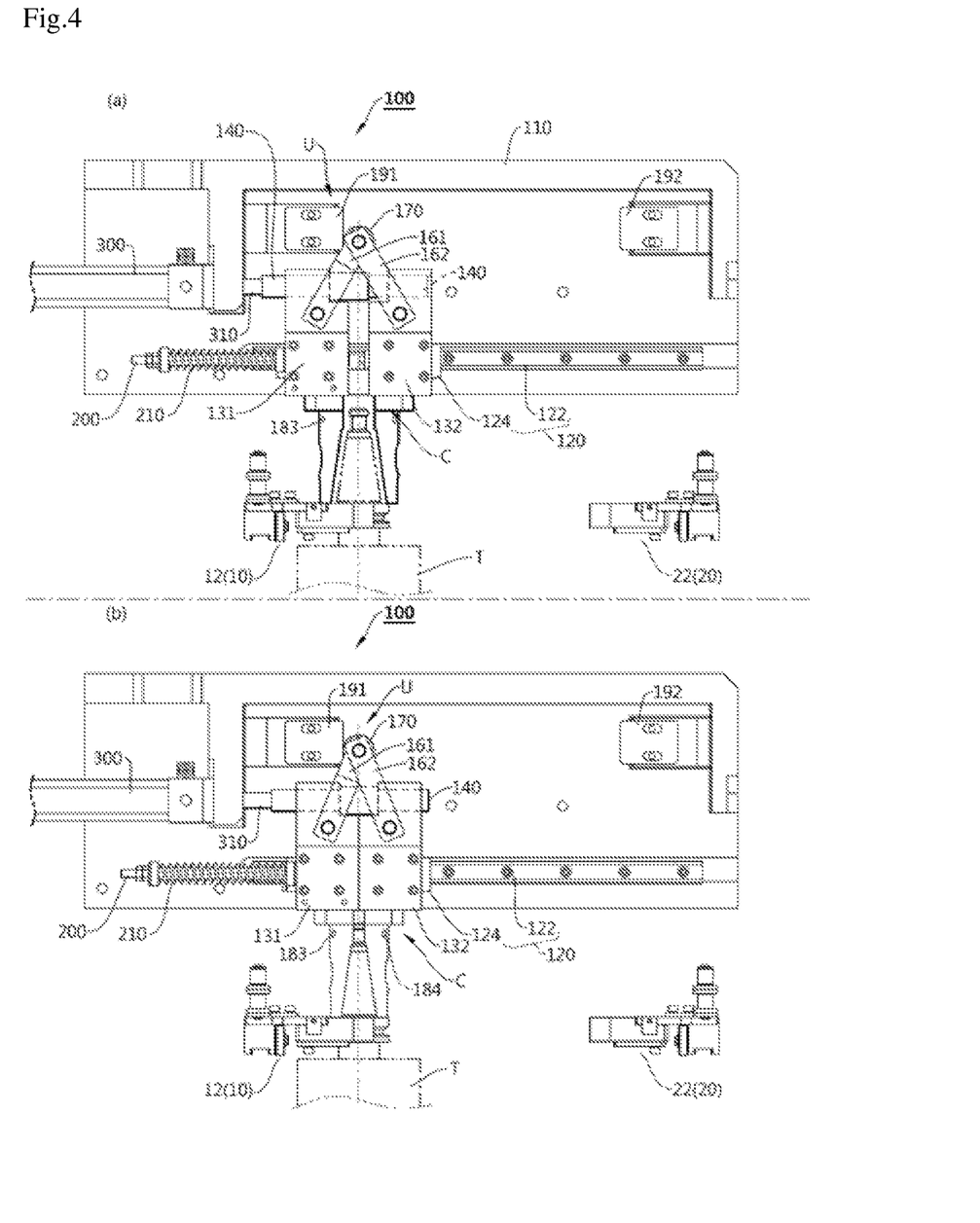
FIG. 4 is a view for explaining operations of clamping and unclamping a tool at a first tool magazine side.
Figure 5:
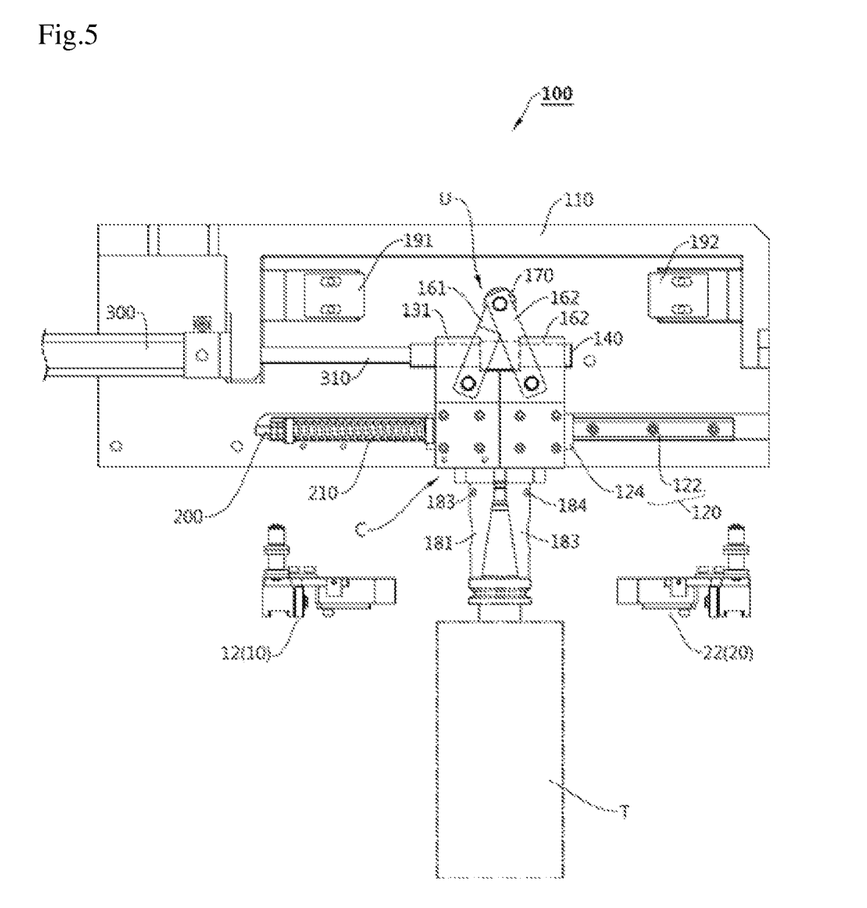
FIG. 5 is a view for explaining an example in which a tool is moved between the first tool magazine and a second tool magazine.
Figure 6:
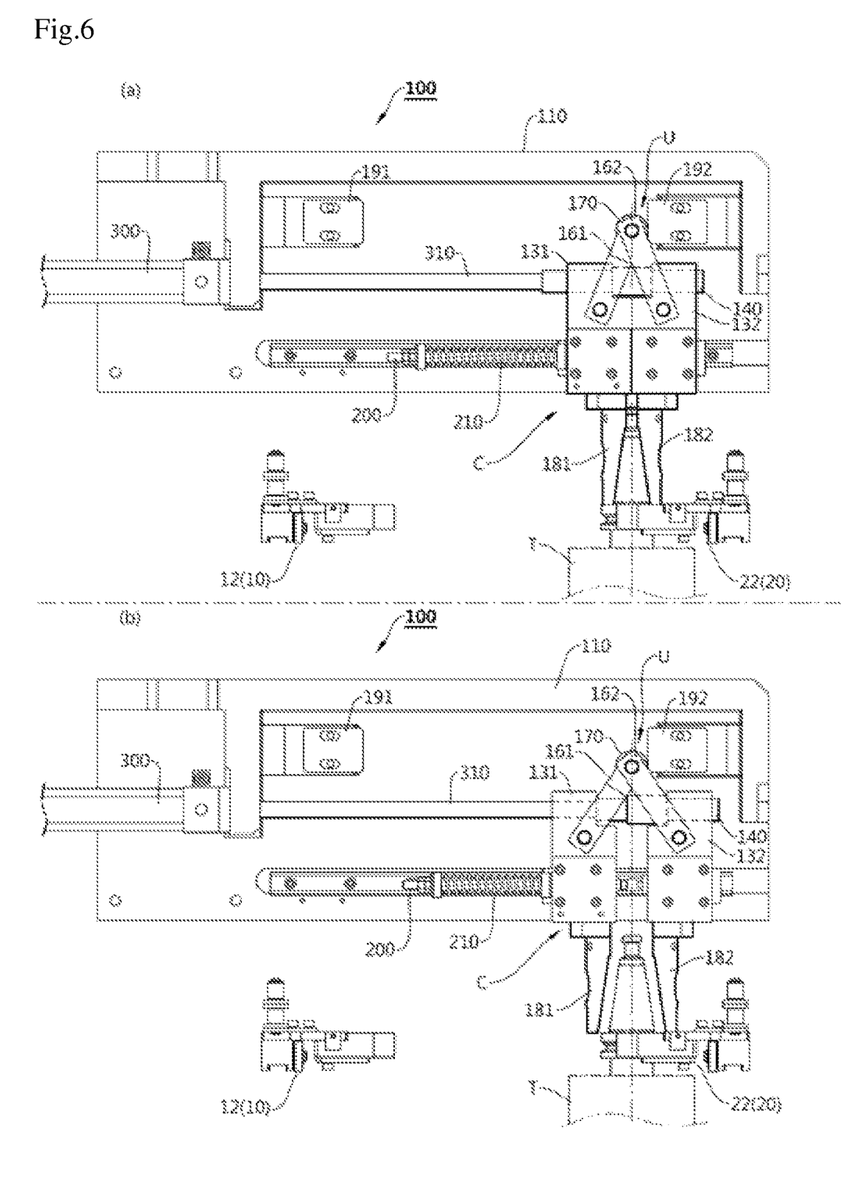
FIG. 6 is a view for explaining operations of clamping and unclamping a tool at the second tool magazine side.

FIGS. 4 to 6 are views for explaining an operation of the tool carrier unit of the tool magazine according to the exemplary embodiment of the present disclosure, in which FIG. 4 is a view for explaining operations of clamping and unclamping the tool at the first tool magazine side, FIG. 5 is a view for explaining an example in which the tool is moved between the first tool magazine and the second tool magazine, and FIG. 6 is a view for explaining operations of clamping and unclamping the tool at the second tool magazine side.

The clamping unit C may be on standby at the tool change position of any one of the first tool magazine 10 and the second tool magazine 20, and the clamping unit C is on standby in an unclamped state in which the clamping unit C is spread by the unclamping unit U.

FIG. 4(a), which is an accompanying drawing, illustrates a state in which the clamping unit C is unclamped at the first tool magazine 10 side, and as the actuator 300 is maximally contracted to pull the rod 310, and the rod 310 is pulled, the rod 310 pulls the shaft 140 in the left direction of the drawing, and thereby the first clamp block 131 is pulled, however because the first clamp block 131 is connected to the first link 161, the roller 170 installed on an upper side of the first link 161 is lowered by being carried by the first link 161 without being moved in a direction in which the rod 310 is moved.

Thereafter, as the roller 170 is lowered, the second link 162 moves the second clamp block 132 in a direction opposite to a direction in which the first clamp block 131 is pulled, and as a result, the first clamp block 131 and the second clamp block 132 are spread.

As described above, as the first and second clamp blocks 131 and 132 are spread, the first and second jaws 181 and 182 are spread such that the tool T is freely moved between the first jaw 181 and the second jaw 182.

Meanwhile, the large diameter portion 142 of the shaft 140 is maintained to be in close contact with the first clamp block 131, and maintained to be spaced apart from the second clamp block 132.

Thereafter, when a tool change command is executed, the selected tool T is selected at the first tool magazine 10 and then moved to the tool change position, and thereafter, the actuator 300 performs an extension operation.

FIG. 4(b), which is an accompanying drawing, illustrates a state in which the actuator 300 clamps the tool T by being extended from a state of being maximally contracted.

That is, when the rod of the actuator 300 is moved to the right when seen from the drawing, the shaft 140 becomes close to the second clamp block 132, and at this time, the first and second clamp blocks 131 and 132 become close to each other by restoring force of the clamp spring 210 such that the tool T is clamped inside the first and second jaws 181 and 182.

Meanwhile, while the first and second clamp blocks 131 and 132 become close to each other, the roller 170 is raised by link structures of the first and second links 161 and 162.

Thereafter, when the actuator 300 continuously and further performs the extension operation, as illustrated in FIG. 5, the clamping unit C is moved in a state of clamping the tool T.

Alternatively, when an operation of clamping the tool T fails at the first and second jaws 181 and 182 of the clamping unit C, the first and second sensors 183 and 184 confirm a state in which the tool T is not present, and sound an alarm or send a failure signal to a control panel.

Thereafter, when the actuator 300 continuously and further performs the extension operation, as illustrated in FIG. 6(a), the clamping unit C is moved from the first tool magazine 10 to the second tool magazine 20, and a state of clamping the tool T is maintained by the clamping unit C to the tool change position of the second tool magazine 20.

Thereafter, when the actuator 300 continuously and further performs the extension operation, as illustrated in FIG. 6(b), the unclamping unit U is operated, and hereinafter, this operation will be described in more detail.

The shaft 140 pushes the second clamp block 132 by a movement of the rod 310, and at this time, the roller 170 is not moved anymore because of being in contact with the second stopper 192, when the second clamp block 132 is further moved, the second link 162 performs an operation of dragging the roller 170 down, and the first link 161, which is connected to the roller 170 by a link structure, pushes the first clamp block 131 in a direction opposite to a direction in which the second clamp block 132 is moved.

That is, as first and second clamp blocks 131 and 132 are spread, the first and second jaws 181 and 182 are spread so as to unclamp the tool T.

Thereafter, the second tool magazine 20 may be driven, and at this time, the tool T accommodated in the second tool gripper unit 22 of the second tool magazine 20 does not interfere with the first and second jaws 181 and 182.

While the description about the operation describes an example in which the tool T accommodated in the first tool magazine 10 is transferred to the second tool magazine 20, in contrast, an operation of transferring the tool T at the second tool magazine 20 side to the first tool magazine 10 side will be easily understood by a person skilled in the art, and thereby a detailed description about this operation will be omitted.

As described above, the tool carrier unit 100 of the tool magazine according to the exemplary embodiment of the present disclosure may transfer the tool T between one side first tool magazine 10 and the other side second tool magazine 20 such that the tool accommodated in the tool magazine disposed at a position far from the spindle may be provided to the spindle, and in contrast, the tool that has been mounted on the spindle may be accommodated in the first tool magazine 10 or the second tool magazine 20.

That is, the tool carrier unit 100 according to the exemplary embodiment of the present disclosure may allow a plurality of tool magazines to be provided so that a large number of tools T may be provided, and moreover, because various tools T may be used, work pieces having more varied and complicated shapes may be processed.

In addition, the tool carrier unit 100 of the tool magazine according to the exemplary embodiment of the present disclosure may additionally mount a new tool magazine even to the existing numerical control multi-tasking machine tool which is used by including a single tool magazine, thereby enlarging and installing the tool magazine.

While the exemplary embodiment of the present disclosure has been described with reference to the accompanying drawings, it can be understood by those skilled in the art that the present disclosure may be implemented as other specific forms without changing the technical spirit and essential characteristics thereof.

Accordingly, it should be understood that the exemplary embodiment described above is illustrative and not restrictive in terms of all aspects, the scope of the present disclosure and the description are defined by the appended claims, and it should be interpreted that the meanings and scope of the claims, and all changed or modified forms that derived from equivalent concepts of the claims are included in the scope of the present disclosure.

The tool carrier unit of the tool magazine according to the present disclosure may be used to transfer the tool accommodated in one tool magazine of a plurality of tool magazines to the other tool magazine.

Although the present disclosure has been described with reference to exemplary and preferred embodiments, workers skilled in the art will recognize that changes may be made in form and detail without departing from the spirit and scope of the disclosure.

The invention claimed is:

1. A tool carrier unit of a tool magazine, comprising:
   a body frame installed across a first tool magazine and a second tool magazine;
   a clamping unit disposed at one side of the body frame and configured to clamp a tool accommodated in any one of the first tool magazine and the second tool magazine;
   a linear motion unit disposed at the one side of the body frame and configured to guide a movement of the clamping unit;
   an actuator disposed at the one side of the body frame and configured to move the clamping unit; and
   an unclamping unit disposed at the body frame and configured to unclamp the tool when the clamping unit reaches the first tool magazine or the second tool magazine,
   wherein the unclamping unit includes:
       a first clamp block installed on the linear motion unit to be linearly moved, and having a second slide hole formed at one side thereof;
       a second clamp block installed on the linear motion unit to be linearly moved, and having a third slide hole formed on one side thereof;
       first and second shaft pins installed in the first and second clamp blocks in a direction orthogonal to a direction in which the first and second clamp blocks are linearly moved;
       a first link having a first end portion coupled to the first shaft pin;
       a second link having a first end portion coupled to the second shaft pin;
       a third shaft pin coupled to respective second end portions of the first link and the second link;
       a roller installed on the third shaft pin;
       first and second stoppers formed at respective first and second end portions of the one side of the body frame with which the roller comes into contact, and on which the roller slides; and
       a shaft having one side fastened to a rod of the actuator to push the first clamp block or the second clamp block in a direction in which the rod is moved.

2. The tool carrier unit of claim 1, wherein the clamping unit further includes:
- the first clamp block having a first slide hole formed at one side thereof, and a first jaw installed at a lower side thereof;
- the second clamp block having a second jaw installed at a lower side thereof opposing the first jaw;
- a clamp shaft penetrating the first slide hole, and having a first end portion fixed to the second clamp block; and
- a clamp spring installed on the clamp shaft, having a first end portion that is in contact with the first clamp block, and a second end portion that is fixed to a second end portion of the clamp shaft, and applying restoring force in a direction in which a gap between the first clamp block and the second clamp block narrows.

3. The tool carrier unit of claim 1, wherein the shaft has a first small diameter portion and a second small diameter portion formed, respectively, at opposing end portions of a large diameter portion, the first small diameter portion penetrates the second slide hole of first clamp block, the second small diameter portion penetrates the third slide hole of the second clamp block, and the first small diameter portion has one side fastened to the rod so that the large diameter portion pushes the first clamp block when the actuator performs a contraction operation, and the large diameter portion pushes the second clamp block when the actuator performs an extension operation.

* * * * *